United States Patent [19]

Reid

[11] Patent Number: 4,850,253

[45] Date of Patent: Jul. 25, 1989

[54] BROACH MANUFACTURING METHOD

[75] Inventor: Ian R. S. Reid, Windsor, Canada

[73] Assignee: Colonial Tool Operations Division of Textron Canada Limited, Canada

[21] Appl. No.: 85,367

[22] Filed: Jul. 24, 1987

[51] Int. Cl.⁴ .............................................. B21K 5/02
[52] U.S. Cl. .................................... 76/101 R; 51/288
[58] Field of Search ................ 51/103 R, 281 R, 288; 76/101 R, 101 A

[56] References Cited

U.S. PATENT DOCUMENTS

| | | | |
|---|---|---|---|
| 2,436,325 | 2/1948 | Penny | 51/288 |
| 2,624,159 | 1/1953 | Balsiger | 51/288 |
| 3,155,086 | 11/1964 | Ornehage | 51/103 R |
| 4,498,361 | 2/1985 | Grace | 51/281 R |

Primary Examiner—Roscoe V. Parker
Attorney, Agent, or Firm—Edward J. Timmer

[57] ABSTRACT

A broach or other tool having a plurality of cutting teeth along its length is produced by simultaneously grinding a plurality of preformed cutting teeth having overside dimensions, such as oversize outer diameters, using a rotating dressed generally cylindrical grinding wheel engaging the oversize teeth along a length of the broach preform to impart reduced final print dimensions such as final outer diameters to the oversize teeth. Outer diameters which increase from one tooth to the next and outer diameters which remain constant for several adjacent teeth can be simultaneously ground. Different clearance angles can also be imparted during the grinding operation.

18 Claims, 3 Drawing Sheets

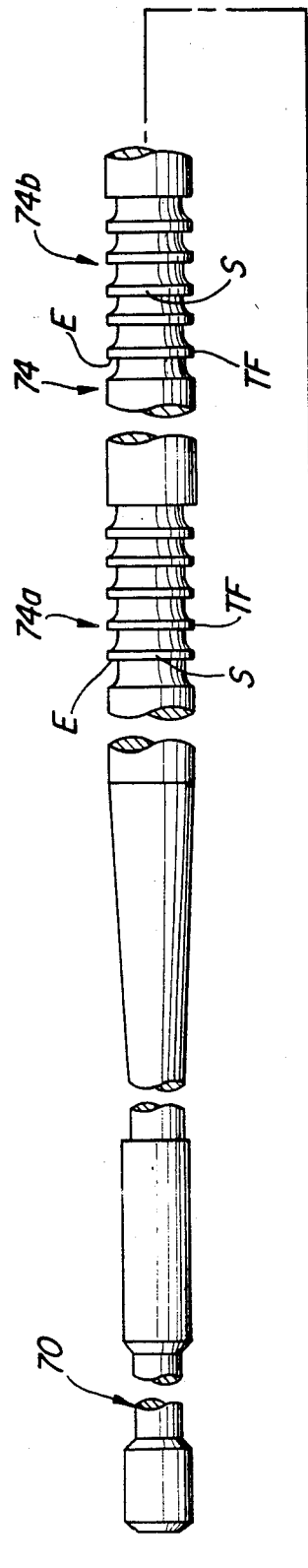
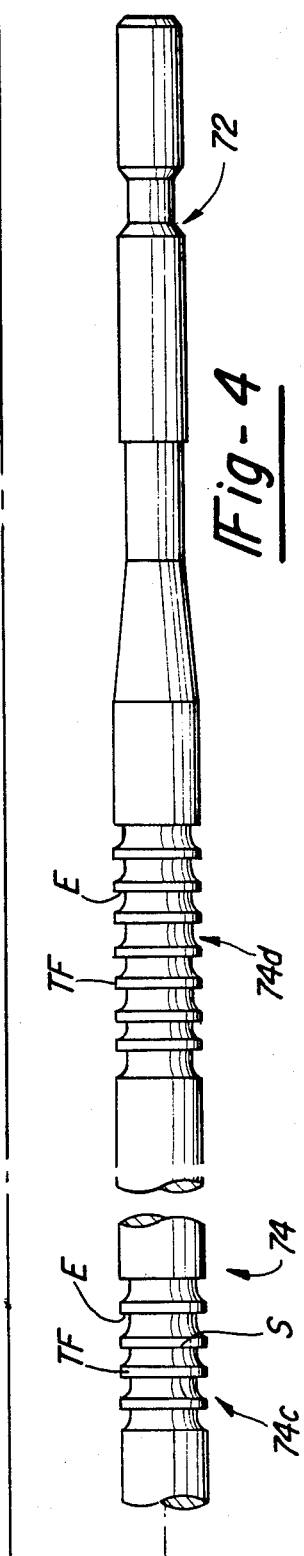
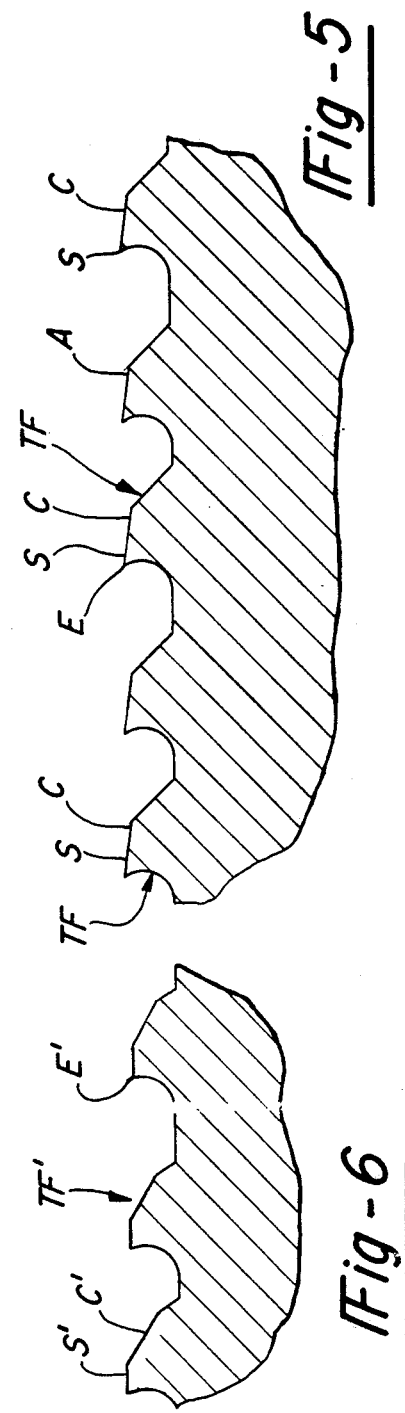

BROACH MANUFACTURING METHOD

FIELD OF THE INVENTION

The invention relates to methods for manufacturing broaching or other tools having a plurality of cutting teeth along their length.

BACKGROUND OF THE INVENTION

In one manufacturing method, a broaching tool is produced from tool steel bar stock by first turning the bar in the soft condition (annealed condition) in a manual lathe operation to form the puller portion adjacent one end of the bar, the retriever portion adjacent the other end and the toothed cutting portion, including a roughing section, semi-finishing section and finishing section, intermediate the puller and retriever portions. Each cutting section includes sequentially arranged cutting teeth having a uniform cutting edge and predetermined increase in tooth size along the length of the cutting portion. In the manual lathe operation, the puller portion, retriever portion and toothed cutting portion are machined to within 0.030–0.050 inch of finished dimension. The so-called gullet radius and hook angle of the cutting teeth are turned in true relation with each other in the manual lathe operation.

Thereafter, the rough turned broaching tool is heat treated to a hardness of $R_c65$ and the cutting edges of the teeth are brought up sharp from the gullet radius manually using a broach sharpening machine designed specifically for this purpose. Then, the external diameters of the broach teeth are reduced to finish size by an O.D. grinding operation with each tooth ground one at a time. The total manufacturing time for a typical round broach employing these steps has been on the order of 8–9 hours and is very manual labor intensive.

The Grace U.S. Pat. No. 4,498,361 issued Feb. 12, 1985, describes an improved method for manufacturing a broaching tool wherein bar stock in the soft or unheat-treated condition is turned to rough machine the outer diameter of the puller and retriever portion and the cutting portion to within 0.030–0.050 inch of finished dimensions. During this rough turning step, the broach teeth are turned to have a finished gullet cavity with the gullet radius intersecting an oversized hook angle on each tooth. Following heat treatment of the rough turned stock, a second turning operation is conducted in which the rough turned stock in the hard (heat treated) condition is turned to reduce the tooth outer diameters and to machine the back-off angles on the roughing section and semi-finishing section to finish dimension. The outer diameter and back-off angle of the finishing section is turned to slightly oversize dimension and then the hook angle "oversize" is nicked off and blended with the previously soft-turned gullet radius. After the hard turning operation, external diameters and back-off angles of the teeth in the finishing section may be subjected to a grinding operation to provide the close tolerances normally required in the finishing section of the cutting portion. The outer diameters of the finishing section are brought to finished dimension by performing a grinding operation on each tooth one at a time until all of the teeth have been ground to finished dimension.

SUMMARY OF THE INVENTION

The invention contemplates a method for making a broaching or other tool having a length along which a plurality of different size cutting teeth are disposed wherein a plurality of cutting teeth having oversize dimensions are simultaneously machined by a rotating grinding wheel engaging the tool length and dressed to grind one or more of the cutting teeth to a selected reduced dimension, such as final outer diameter, and one or more of the other cutting teeth to a different selected reduced dimension such as a different outer diameter.

In a typical working embodiment for making an elongated broaching tool, a broach preform having a plurality of broach teeth with oversize outer diameters along its length is rotatably supported, preferably rotatably driven by a regulating wheel, on a centerless grinding machine and the plurality of broach teeth are simultaneously ground with a rotating grinding wheel to impart a progressively increasing reduced outer diameter from one tooth to the next to some of the broach teeth adjacent the leading end of the broaching tool and a greater reduced outer diameter to other of the broach teeth adjacent the trailing end of the broaching tool. The grinding wheel is dressed along its length to provide grinding surfaces with different dimensions to impart the aforesaid different reduced dimensions to the oversize teeth during grinding. The axial position of the broach teeth on the preform is maintained within close tolerance along the length of the preform to enable the broach teeth to be ground simultaneously to final print dimensions.

The plurality of oversize broach teeth can also be simultaneously ground by the rotating grinding wheel such that some of the broach teeth have a selected clearance or back-off angle and other of the broach teeth have a different clearance or back-off angle.

In a preferred embodiment of the invention, an entire length of broaching tool including a puller portion, cutting portion and retriever portion can be manufactured by simultaneously grinding oversize portions of a broach preform using a dressed rotating grinding wheel.

BRIEF DESCRIPTION OF THE DRAWINGS

FIG. 4 is an elevation of a round or cylindrical broaching tool manufactureable by the method of the invention.

FIG. 5 is a partial sectional view of several broach teeth showing clearance angle thereon.

FIG. 6 is a partial sectional view of several broach teeth having a different profile from those of FIG. 5.

BEST MODE FOR PRACTICING INVENTION

Figure 1:
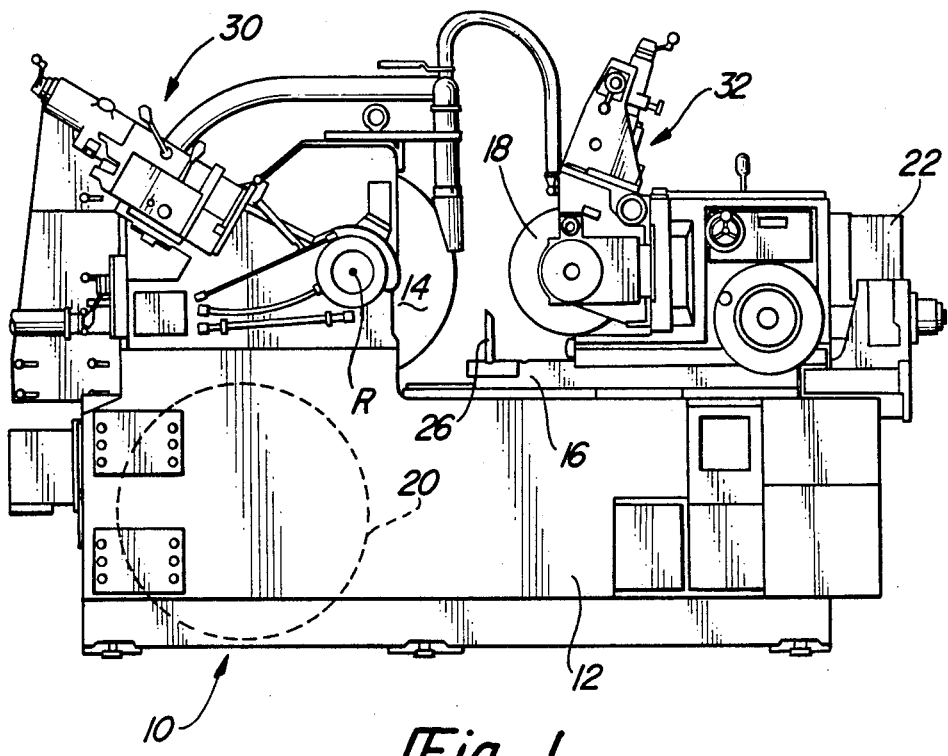
FIG. 1 is a front elevation of a centerless grinding machine on which the method of the invention can be practiced.

The method of the invention can be practiced on the centerless grinding machine 10 shown in FIG. 1. The grinding machine includes a base 12 having a cylindrical grinding wheel 14 rotatably mounted thereon. An infeed slide 16 is slidably mounted on base 12 for movement perpendicular to the rotational axis R of the grinding wheel. Carried on the slide 16 is a rotatably mounted regulating wheel 18 having rotational axis RR.

An electrical drive motor 20 on base 12 rotates the grinding wheel through a suitable power transmission mechanism and an electrical drive motor 22 on slide 16 rotates the regulating wheel 18 through a suitable power transmission mechanism.

The grinding wheel 14 can be a conventional abrasive wheel such as an alumina wheel. Regulating wheel 18 is a conventional regulating wheel made of rubber or other resilient material that can drivingly engage a broach preform P.

Positioned between grinding wheel 14 and regulating wheel 18 on the slide 16 is a workpiece rest or shoe 26 for supporting broach preform P for free rotation on the rest during grinding as will be explained. Rest or shoe 26 carries adjustable stops (not shown) between which the broach preform P is located in desired position for grinding by the grinding wheel and rotation by the regulating wheel.

A centerless grinding machine having grinding wheel 14, regulating wheel 18 and respective dressing units 30,32 as well as a workpart rest 26 is commercially available as model 300 Series Twingrip centerless grinding machine from Cincinnati Milacron Corp.

Figure 2:
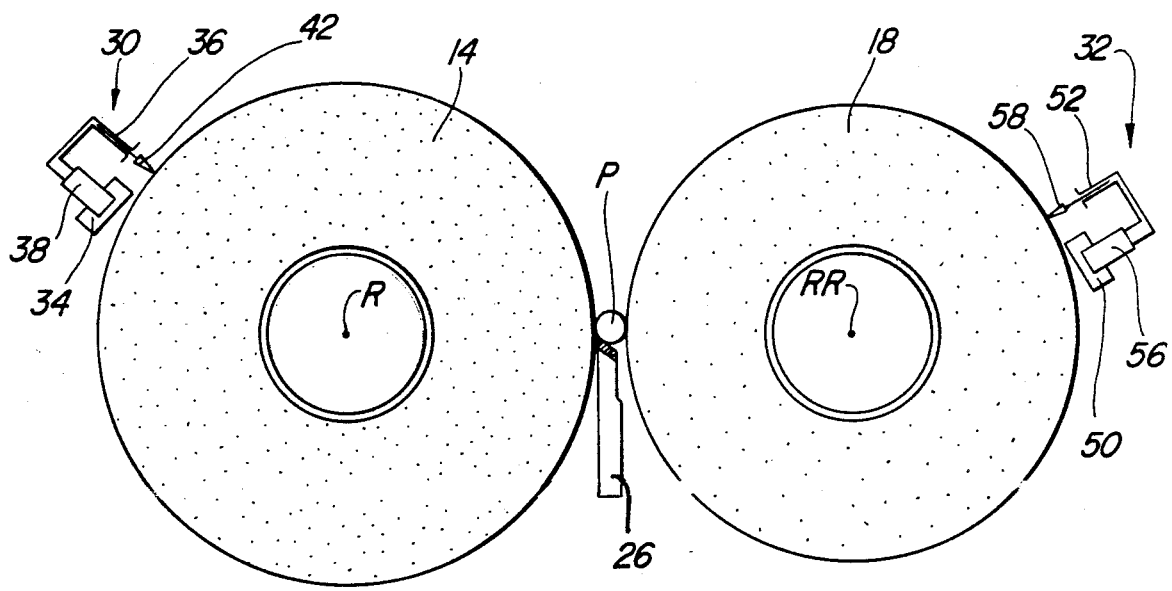
FIG. 2 is a front schematic elevation of the grinding wheel and regulating wheel with a broach preform therebetween supported on a workpart rest or shoe.

The grinding wheel 14 and regulating wheel 18 have respective truing or dressing units 30 and 32 associated therewith. As shown best in FIGS. 2 and 3, dressing unit 30 for grinding wheel 14 includes a master cam 34 and a diamond dresser 36 movable by slide 38 along the length of the master cam 34. Dresser 36 includes a knife-edge 40 that rides on and follows the cam surfaces 34a and a diamond dresser tip 42 that is caused to trace a path in accordance with the cam surfaces 34a as the knife-edge follows the surfaces. Diamond dresser tip 42 engages the grinding wheel to dress surfaces thereon dictated by the cam surfaces 34a and by the relative position of the dresser along the length of the cam 34 into the grinding wheel 14.

The truing or dressing unit 32 for the regulating wheel 18 also includes a master cam 50 and wheel dresser 52. Master cam 50 includes cam surfaces 50a and wheel dresser 52 includes a knife edge 54 that is movable over the cam surfaces by slide 56 and a dresser tip 58 that traces a path in accordance with the cam surfaces 50a and with relative dresser position along the length of the master cam 50. Dresser tip 58 engages the regulating wheel 18 to dress surfaces thereon dictated by the cam surfaces 50a and by the relative position of the dresser 52 along the length of the master cam 50.

FIGS. 4 and 5 illustrate a typical elongated generally cylindrical broach tool manufactureably by the method of the invention to finished dimension. The broaching tool includes a puller portion 70 adjacent a leading end, a retriever portion 72 adjacent the opposite trailing end and a cutting portion 74 therebetween along the length of the broaching tool. The cutting portion 74 may include four cutting sections (or more or less) such as a first section 74a, second section 74b, third section 74c and fourth section 74d. Sections 74a–74c are each comprised of multiple finished cylindrical broach cutting teeth TF which have a uniform annular circular cutting edge E and which have a precalculated rise (or increase in outer diameter) from one tooth to the next and from one section of teeth to the next. Each tooth TF in sections 74a–74c has an outer tapered clearance surface C and a maximum outer diameter at S adjacent cutting edge E. Clearance surface C is defined by a taper or back-off angle A relative to the longitudinal axis of the preform as shown in FIG. 5.

The clearance or back-off angles of the teeth in each section are typically the same from one tooth to the next in that section while the outer diameter of the teeth in each section progressively increases from one tooth to the next. The clearance angle from one cutting section to the next changes; e.g., typically decreases from one cutting section to the next.

The fourth section 74d includes a plurality of teeth TF whose outer diameters are preferably substantially the same from one tooth to the next in this section. The tooth clearance angle is likewise preferably constant from one tooth to the next in this section 74d. However, the clearance angle A may change in selected manner from one tooth to the next and the clearance angle may be selected to be any desired angle.

As shown in FIG. 6 in accordance with another embodiment of the invention, broach cutting teeth TF, having oversize cylindrical portion S' extending axially from cutting edge E' and terminating in a clearance surface C' can be provided along the length of the broach preform and can be ground to final reduced dimension by the method of the invention.

In accordance with the method of the invention, the broaching tool shown in FIGS. 4 and 5 is manufactured from broach preform P using rotating grinding wheel 14 dressed to simultaneously grind all oversize teeth TS on the preform each to reduced final dimension; e.g., to the final maximum outer diameter S and clearance angle A, required for the finished broaching tooth TF of FIGS. 4 and 5.

To this end, the cylindrical grinding wheel 14 is dressed to have a plurality of grinding surfaces 80 to grind the oversize broach preform teeth TS to reduced final maximum outer diameters and clearance angles, if applicable. In accordance with the invention, master cam 34 includes cam surfaces 34a that are configured relative to the centerline or longitudinal axis of the broach preform P to correspond to the selected outer diameters S and clearance angles A, where applicable, to be ground on the preform teeth TS so as to thereby form the finished broach teeth TF. As a result of the dressing or cutting action of the diamond dresser tip 42, the grinding wheel will have dressed grinding surfaces 80 that are complementary mirror image in configuration to cam surfaces 34a and the finished teeth TF of the broaching tool, FIG. 3.

Figure 3:
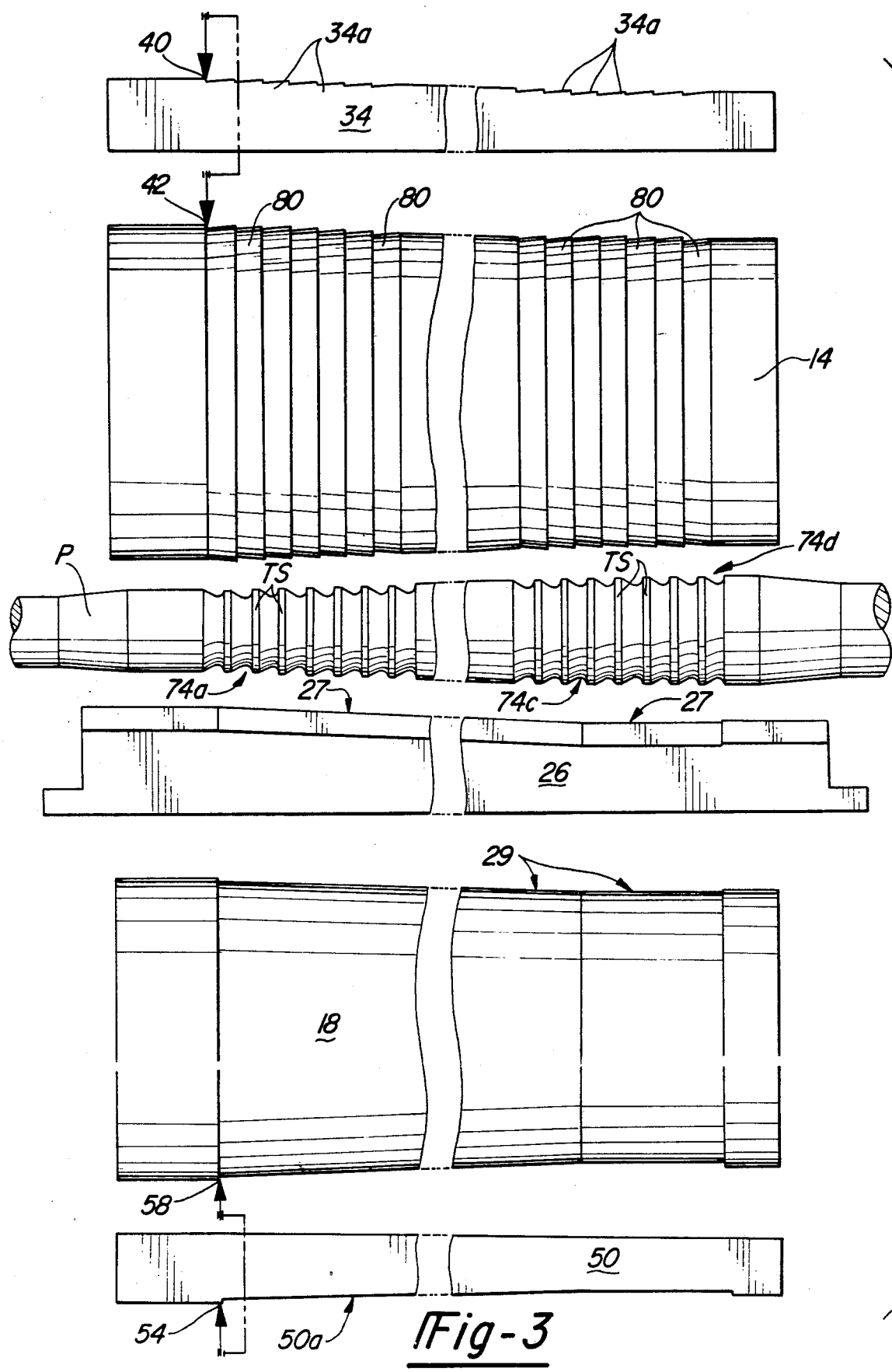
FIG. 3 is a schematic exploded elevational view of the grinding wheel, regulating wheel, broach preform and associated dressing units for the grinding wheel and regulating wheel.

The broach preform P rests rotatably on rest or shoe 26 that includes along its length as shown in FIG. 3 a rest surface 27 tapered relative to the centerline or longitudinal axis of broach preform P to correspond to the overall taper profile to be imparted to each of the various finishing cutting sections 74a–74d of cutting teeth so as to support the broach preform properly as it is ground by wheel 14.

Grinding wheel 14 and broach preform P are engaged along the length of the wheel by advancing the infeed slide 16 on which regulating wheel 18 and rest 26 are supported toward the rotating dressed grinding wheel 14. Regulating wheel 18 is rotated to drive the broach preform in rotation during grinding. To effect proper driving engagement between the regulating wheel and preform and to maintain the longitudinal axis of the preform in the proper position with regard to the grinding wheel, the regulating wheel is dressed by unit 32 prior to grinding to have regulating surfaces 29 configured relative to the longitudinal axis of preform P to correspond to the overall taper profile to be imparted to each of the various finished cutting sections 74a–74c of cutting teeth, FIG. 3. Of course, master cam 50 has cam surfaces 50a properly configured to this end. The rotational or longitudinal axis of the broach preform P is shown parallel with that of the grinding wheel 14 during grinding; other spatial orientations between the axes of wheel 14 and preform P can be accommodated during grinding however.

It is apparent that when the broach preform is advanced against the rotating dressed grinding wheel 14 at a proper infeed rate that grinding surfaces 80 will impart the desired outer diameters and clearance angles, where applicable, to the oversize teeth TS by grinding away stock from the oversize teeth TS and thereby form finished teeth having reduced outer maximum diameters and clearance angles, where applicable, ground to final or finished dimension in accordance with finished part print tolerance. Of course, all of the preform teeth TS are simultaneously ground by the wheel 14 as the preform is advanced thereagainst by slide 16.

Broach preform P, as mentioned, includes oversize teeth TS. Teeth TS may be uniformly oversized in that all the teeth TS could be preformed to have the same oversize outer diameters. In this situation, different teeth would be reduced to different extents during the simultaneous grinding operation. Or, preferably, the teeth TS have different oversize outer diameters from one cutting section 74a–74d to another such that all the teeth are oversize by the same amount; e.g., each tooth in each section 74a–74d could be oversize in diameter by 0.030 inch so that during grinding each tooth oversize diameter is reduced the same extent to achieve the finished outer diameter dimension. Typically, oversize teeth TS are formed on broach preform P by turning tool steel cylindrical bar stock on a computer controlled lathe of the type referred to in the Grace U.S. Pat. No. 4,498,361 cited hereinabove. The axial location or position of the teeth TS along the longitudinal axis held to close tolerance; e.g., preferably within ±0.002 inch of desired position along the length of the preform relative to reference locations along the length; e.g., relative to the end of puller portion 70 and/or an intermediate reference position along the length of the preform between the ends thereof, such that when the broach preform is placed between fixed stops on the rest 26, the grinding surfaces 80 of the grinding wheel and preform teeth TS are accurately positioned relative to one another. This insures the simultaneous grinding operation will produce finished teeth TF with outer diameters within tolerance for the finished teeth since relative axial position of the wheel 14 and preform P affects the dimension of the outer diameters ground.

By accurately controlling turning of each broach preform to have teeth TS located within preset close tolerance along the axial length of the preform, the grinding operation can be performed on successive multiple broach preforms with assurance that the finished teeth TF will have maximum outer diameter dimensions within close tolerance from one broaching tool to the next.

Thus far, the method of the invention has been described with respect to grinding the preform teeth TS simultaneously to yield finished teeth within final part print tolerance. It will be apparent that the outer diameters and chamfers on the puller portion 70 and retriever portion 72 of the broaching tool shown in FIG. 4 can be simultaneously ground with the cutting teeth TF by using a grinding wheel 14, regulating wheel 18 and rest 26 of sufficient length and dressed appropriately by units 30,32. In this way a complete finished broaching tool can be ground from the broach preform; that is, the entire length of the broaching preform can be ground to finished dimension.

The broach preform P is heat treated prior to grinding to impart proper hardness thereto for cutting workpieces after grinding to final dimension in accordance with the invention.

While the invention has been described by a detailed description of certain specific and preferred embodiments, it is understood that various modifications and changes can be made in them within the scope of the appended claims which are intended to include equivalents of such embodiments.

I claim:

1. A method for making a tool having a length along which multiple cutting sections, each having a plurality of cutting teeth, are disposed comprising:
    (a) rotatably supporting a tool preform having said multiple cutting sections along the length of the preform with each cutting section including a plurality of cutting teeth disposed along the length of each cutting section and having oversize dimensions, and
    (b) simultaneously grinding the plurality of cutting teeth of all of said cutting sections with a rotating grinding wheel to impart reduced final dimensions to the cutting teeth with the reduced final dimension of one or more of the cutting teeth being different from the reduced final dimension of another one or more of the cutting teeth along said length, said grinding being effected by relatively engaging the rotating grinding wheel and said cutting teeth of the preform with the grinding wheel dressed to provide respective grinding surfaces along its length having different dimensions to impart the reduced final dimension to said one or more of the cutting teeth and the different reduced final dimension to said another one or more of the cutting teeth.

2. The method of claim 1 wherein the oversize cutting teeth of the tool preform are formed to a selected close axial tolerance along the length of the preform relative to a reference position thereon.

3. The method of claim 1 including the step of dressing the grinding wheel along its length to have a plurality of working surfaces which have dimensions that are complementary mirror image to the reduced final dimensions to be ground onto the cutting teeth.

4. The method of claim 3 wherein the grinding wheel is dressed by a dresser movable along the length of the wheel as it rotates and is movable toward and away from the wheel in accordance with a master cam having the desired dimensions to be imparted to the cutting teeth along the length of the tool.

5. The method of claim 1 wherein the tool preform is driven to rotate during grinding.

6. The method of claim 1 wherein the speed of rotation of the tool preform is different from the speed of rotation of the grinding wheel during grinding.

7. The method of claim 1 wherein said one or more of the cutting teeth are ground with a reduced outer diameter and said another one or more of the cutting teeth are ground with a different reduced final outer diameter.

8. The method of claim 7 wherein said one or more of the cutting teeth are ground with a clearance angle on said reduced outer diameter and said another one or more of the cutting teeth are ground with a different reduced clearance angle on said different outer diameter.

9. The method of claim 1 wherein said plurality of cutting teeth includes a first tooth having said reduced final dimension and a second tooth having said different reduced final dimension wherein said different reduced final dimension is greater than said reduced final dimension.

10. The method of claim 1 wherein some of said plurality of cutting teeth on the preform have a different oversize dimension from one tooth to the next.

11. The method of claim 1 or 10 wherein in grinding step (b), said some of the cutting teeth are ground to have a reduced final dimension different from one tooth to the next along a length of the broaching 12. A method for making an elongated broaching tool having a length along which a plurality of first teeth in a first cutting section are disposed followed by a plurality of second teeth in a second cutting section, comprising the steps of:
  (a) rotatably driving a broach preform having
    (1) said first cutting section with a plurality of said first teeth disposed along the length of said first cutting section and having oversize outer diameters and (2) said second cutting section with a plurality of said second teeth disposed along the length of said second cutting section and having oversize outer diameters,
  (b) simultaneously grinding the plurality of first teeth of said first cutting section and the second teeth of said second cutting section using a rotating grinding wheel to impart reduced final outer diameters to the first and second cutting teeth with the reduced final outer diameter of one or more of the first teeth being greater than the reduced final outer diameter of one or more of the second teeth, said grinding being effected by relatively engaging the rotating grinding wheel and said length of the preform with the grinding wheel dressed to provide respective first tooth grinding surfaces and second tooth grinding surfaces along its length having different dimensions to impart the reduced final outer diameter to said one or more of the first teeth and the greater reduced final outer diameter to said one or more of the second teeth.

13. The method of claim 13 wherein the grinding step (b) includes imparting a clearance angle to each of the first teeth and a clearance angle to each of the second teeth.

14. The method of claim 13 wherein the grinding step (b) includes imparting said clearance angle to each of the first teeth and a different clearance angle to each of the second teeth.

15. The method of claim 12 wherein in the grinding step (b), the reduced outer diameter of each of the first teeth is ground so as to increase from one tooth to the next along said length.

16. The method of claim 15 wherein in the grinding step (b), the different reduced diameter of each of the second teeth is ground to be substantially equal from one tooth to the next along said length.

17. The method of claim 12 including in the grinding step (b), grinding one or more third teeth of a third cutting section disposed between the first teeth and second teeth with at least one third tooth having a reduced final outer diameter intermediate said reduced final outer diameter of said one or more first teeth and said reduced final outer diameter of said one or more second teeth.

18. The method of claim 12 including the further step of machining the broach preform to have the first teeth and second teeth disposed along the length of the preform to within a selected close axial tolerance relative to a reference position on the preform.

* * * * *

UNITED STATES PATENT AND TRADEMARK OFFICE
CERTIFICATE OF CORRECTION

PATENT NO. : 4,850,253
DATED : July 25, 1989
INVENTOR(S) : Ian R.S. Reid et al.

It is certified that error appears in the above-identified patent and that said Letters Patent is hereby corrected as shown below:

On the Title page, item [75] Inventor, please add the following:

--Wallace C. Grace, Sebring, Florida,
Walter P. Boychuck, Windsor, Ontario--.

IN THE CLAIMS:

Column 6, line 34, after "length" insert --of the preform--.

Column 7, line 19, "broaching" should read --tool--.

Column 8, line 10, delete "13" and insert --12-- therefor.

Signed and Sealed this

Twentieth Day of July, 1993

Attest:

MICHAEL K. KIRK

Attesting Officer     Acting Commissioner of Patents and Trademarks